United States Patent [19]

Stokes et al.

[11] Patent Number: 4,844,320
[45] Date of Patent: Jul. 4, 1989

[54] CONTROL SYSTEM AND METHOD FOR VIBRATION WELDING

[75] Inventors: Vijay K. Stokes, Schenectady; Louis P. Inzinna, Scotia, both of N.Y.

[73] Assignee: General Electric Company, Schenectady, N.Y.

[21] Appl. No.: 265,609

[22] Filed: Nov. 1, 1988

Related U.S. Application Data

[63] Continuation of Ser. No. 15,260, Feb. 17, 1987, abandoned, which is a continuation of Ser. No. 794,990, Oct. 3, 1985, abandoned.

[51] Int. Cl.$^4$ ............................................. B32B 31/16
[52] U.S. Cl. ................................. 228/102; 156/73.6; 156/580.1; 228/3.1
[58] Field of Search ................. 228/3.1, 102, 103, 1.1, 228/2; 156/73.5, 73.6, 580.1, 580.2, 580

[56] References Cited

U.S. PATENT DOCUMENTS

| | | | |
|---|---|---|---|
| 3,405,024 | 10/1968 | Attwood | 156/580.1 |
| 3,647,599 | 3/1972 | Gardner | 156/580.1 |
| 4,252,587 | 2/1981 | Harden et al. | 228/2 X |
| 4,614,292 | 9/1986 | Polansky et al. | 228/3.1 X |

FOREIGN PATENT DOCUMENTS

| | | | |
|---|---|---|---|
| 753664 | 8/1980 | U.S.S.R. | 156/580.1 |
| 829442 | 5/1981 | U.S.S.R. | 156/580.1 |

OTHER PUBLICATIONS

Crawford, "Friction Welding of Plastics", Journal of Materials Science, vol. 16 (1981), pp. 3275–3282.
*Marks-Standard Handbook for Mechanical Engineers,* 8th Ed., (1978), McGraw Hill Book Co., New York, pp. 12-142.
Hydroacoustics, Inc. Brochure, "Hydroweld-Linear Vibration Welders", pp. 1–3.
Branson Sonic Power Co., Brochure, "Vibration Welding", 1980, pp. 1–4.
Richard D. Holtz, "Vibration Welding: Fast, Quiet, Efficient", Assembly Engineering, Jul. 1979, 4 pages.

*Primary Examiner*—Kenneth J. Ramsey
*Attorney, Agent, or Firm*—William H. Steinberg; James C. Davis, Jr.; Paul R. Webb, II

[57] ABSTRACT

A displacement transducer is used to continuously monitor the distance between two fixtures securing parts to be welded. The signal from the displacement transducer is used to stop the welding process when a desired amount of material has been extruded from the weld. The control strategy will automatically take into account part nonuniformities that normally result in poor welds in welding processes that use time as the control variable.

2 Claims, 4 Drawing Sheets

CONTROL SYSTEM AND METHOD FOR VIBRATION WELDING

This application is a continuation of application Ser. No. 015,260, filed 2/17/87 which is a continuation of Ser. No. 794,990, filed Oct. 3, 1985, both of which are abandoned.

BACKGROUND OF THE INVENTION

The present invention relates to a control system and method for vibration welding thermoplastics.

Vibration welding is achieved by vibrating two parts under pressure along their common interface to generate frictional heat to melt and fuse thermoplastic parts together. Vibration welding is a fast inexpensive way to join irregularly shaped parts that are large or small.

Presently, vibration welding is used in non-demanding (i.e. limited load-bearing) applications. However, in application such as plastic bumpers for automobiles, where the welds have to withstand high impact, not enough has been known on how to achieve repeatability and adequate weld strengths.

Vibration weld parameters are set by trial and error. Once a pressure and frequency have been selected, each weld is accomplished by performing the vibration for a predetermined time that is found to be satisfactory. The time parameter when used as the variable for terminating the weld process is sensitive to part uniformity and slight variations in pressure. Minor variations in part geometry can result in significant changes in the weld time required for a quality weld.

It is an object of the present invention to provide a method and a control system for a weld machine that provides uniform quality welds that are repeatable.

SUMMARY OF THE INVENTION

In one aspect of the present invention a control for a vibration welding machine is provided where the vibration welding machine includes means for applying pressure to parts to be welded along their common interface and means for moving the parts to be welded along their common interface relative to one another. The control comprises means for monitoring the weld penetration during the vibration welding process and means for stopping the movement along the common interface of the parts being welded when a predetermined weld penetration amount of material has been achieved.

In another aspect of the present invention a method of vibration welding thermoplastic parts is provided comprising the steps of holding the parts to be welded together under pressure with the surfaces to be welded in contact with one another. One part is then vibrated relative to the other in the plane of the contact surfaces causing thermoplastic parts in contact with one another to melt. The weld penetration is continuously monitored and the vibration of one part relative to the other is stopped, when a predetermined weld penetration has been achieved.

BRIEF DESCRIPTION OF THE DRAWING

While the specification concludes with claims particularly pointing out and distinctly claiming the present invention, objects and advantages of the invention can be more readily ascertained from the following description of a preferred embodiment when used in conjunction with the accompanying drawing in which:

DETAILED DESCRIPTION OF THE INVENTION

Figure 1:
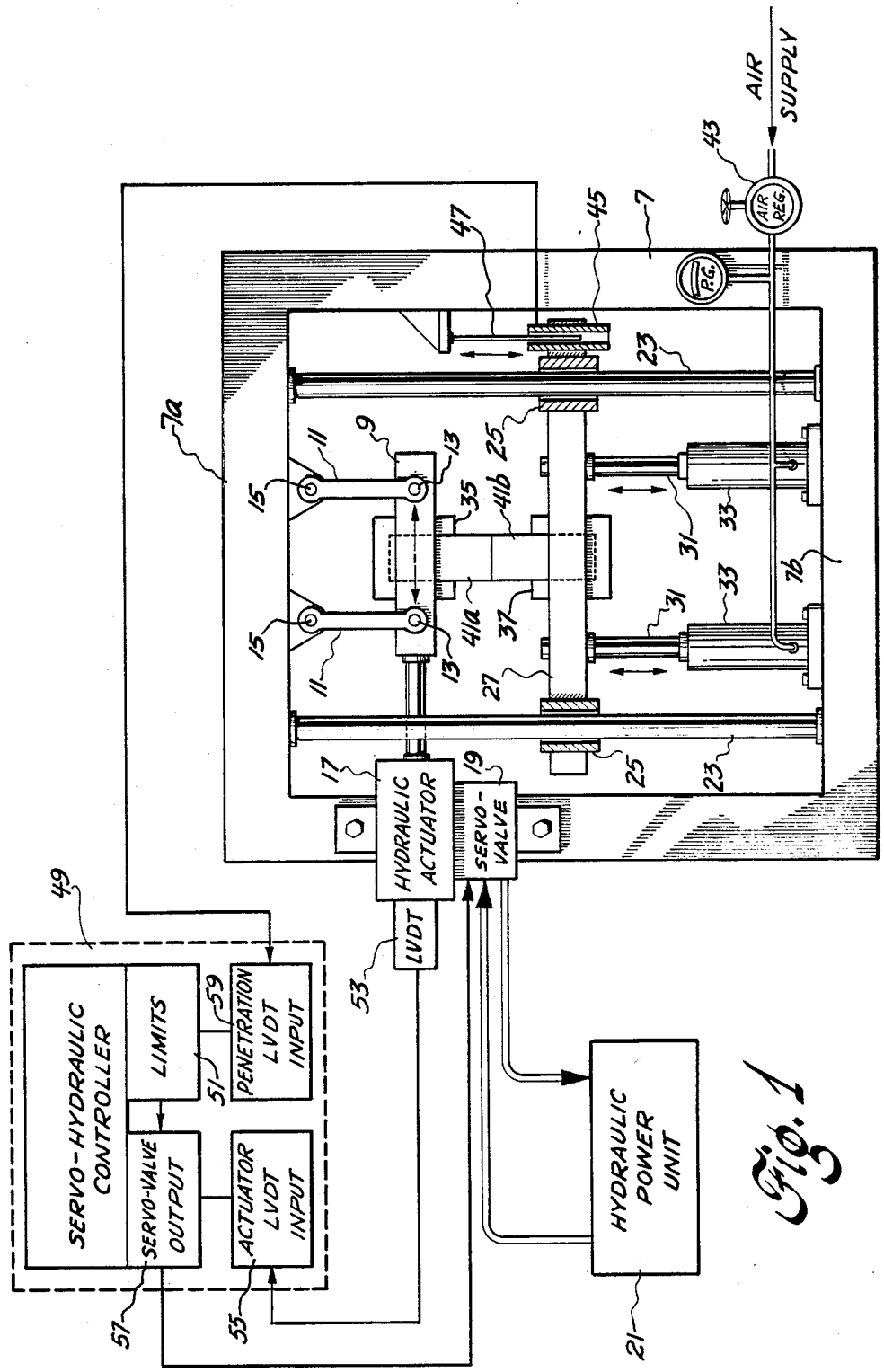
FIG. 1 is a part block diagram and part partially cutaway side view of a control system and vibration welder in accordance with the present invention.

Referring now to the drawing and particularly FIG. 1 thereof, a linear vibration welder and control are shown. An open rectangular steel frame 7 has a horizontally extending upper member 7a which supports an upper platform 9 which is suspended from the upper member by parallel links 11. One end of each of the parallel links is rotatably mounted on pins 13 fixed to the upper member, with the pins extending in the horizontal plane. The other end of each of the parallel links is rotatably mounted on pins 15 extending in the horizontal plane and fixed to the upper platform 9. The parallel links permit horizontal parallel motion of the upper platform relative to the frame.

Reciprocating motion is imparted to the upper platform by a hydraulic actuator 17. The hydraulic actuator receives power through a servo valve 19 which is coupled to a hydraulic power unit 21.

Parallel machined and ground columns 23 extend between the lower and upper horizontal member 7b and 7a, respectively, of the rectangular frame. Bearings 25 affixed to a lower platform 27 permit the lower platform to slide up and down guided by the columns when pistons 31 extend and retract from air cylinders 33 secured to the lower horizontal member of the frame. The upper and lower platforms each have a fixture 35 and 37, respectively, for securing the parts 41a and 41b to be vibration welded.

Prior to welding, the parts 41a and 41b are moved into contact with one another and the interface between the parts to be welded is kept at a predetermined pressure by the air cylinder pistons. The pressure is controlled by an adjustable air regulator 43 which controls the air pressure provided to the air cylinders from a compressed air supply (not shown). A displacement transducer such as a linear variable differential transformer 45 monitors movement of the lower platform relative to the upper platform. The linear variable differential transformer (LVDT) 45 is fixed to the lower platform 27 and the movable core 47 is secured to the frame. The LVDT is an electromagnetic device that produces an AC output voltage proportional to the displacement of a moveable ferromagnetic core when an AC input voltage is provided to the transformer. The LVDT 45 continuously monitors the weld penetration where the weld penetration is defined as the distance two parts to be welded, move toward one another after rubbing of the two parts begins. During vibration welding, the rubber of the two parts together under pressure causes the thermoplastic material to melt and the two parts move towards one another. The amount of this movement is continuously monitored by LVDT 45 and the LVDT output signal is coupled to a closed loop servo hydraulic controller 49. The servo hydraulic controller uses weld penetration as determined by the LVDT as a feedback signal. The amount of the weld penetration is compared in controller 49 to predetermined limits for the materials being welded and the vibration ceases when the predetermined limits have been reached.

The frequency and amplitude of the vibratory motion to the upper platform 9 is determined by the closed loop servo hydraulic controller 49 which uses the position of hydraulic actuator 17 measured by an LVDT 53. The LVDT signal is coupled to closed loop servo hydraulic controller 49 which in turn controls servo valve 19. Servo valve 19 controls the hydraulic fluid flow to hydraulic actuator 17 and thereby controls the upper platform frequency and amplitude.

Figure 2:
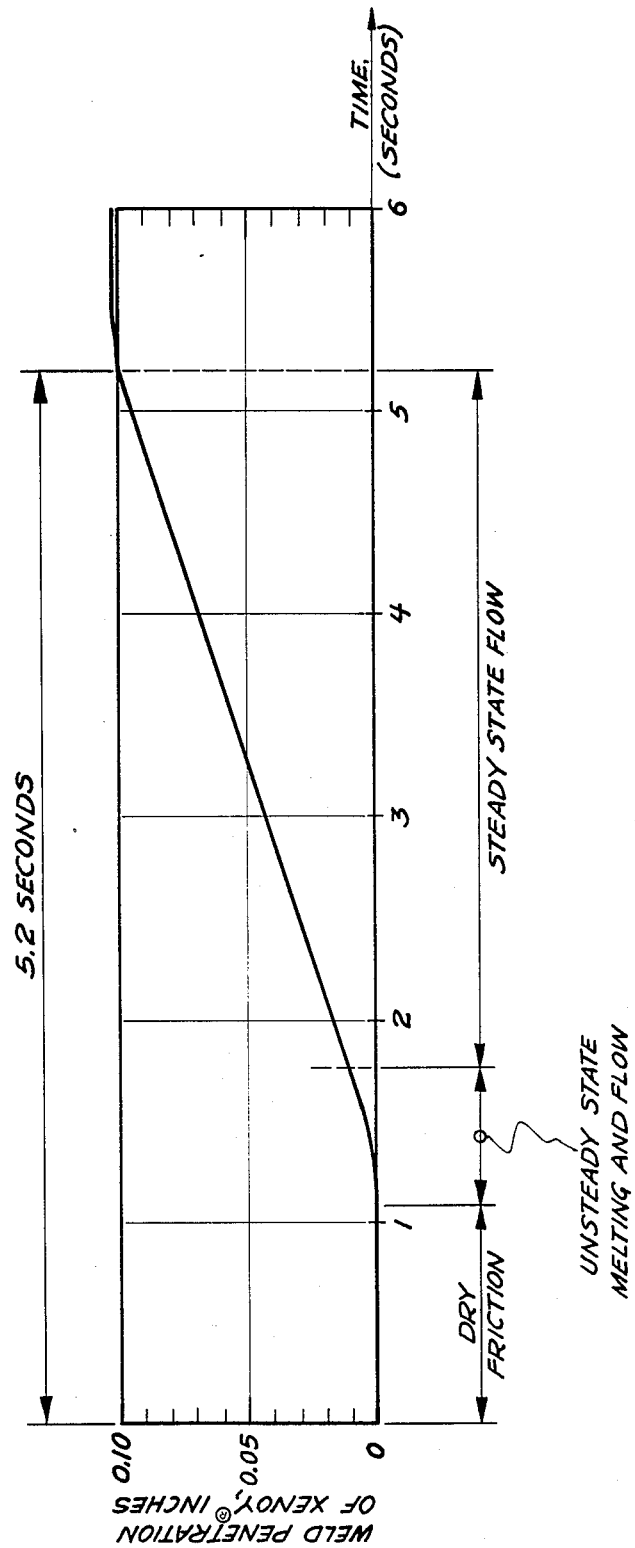
FIG. 2 is a graph showing weld penetration versus time for Xenoy ® thermoplastic resin.

Operation of the control and welding machine will now be described with reference to FIGS. 1 and 2. The frequency, stroke and desired weld penetration are set in a limits block 51 of servo hydraulic controller 49. Air pressure regulator 43 is set at the desired pressure. Referring to FIG. 2 a graph showing weld penetration versus time is shown for a weld of the two Xenoy thermoplastic resin parts. To produce the curve shown in FIG. 2 the weld control was set for a stroke of 0.13 in and a frequency of 120 Hz. The parts were forced together at a pressure of 100 psi. The desired weld penetration was 0.10 inches. At time zero on the time scale of FIG. 2, the vibration of the two parts being held together along their interface under pressure begins. A closed loop control comprising a feedback signal from LVDT 53 monitoring the motion of hydraulic actuator 17 is supplied to the actuator LVDT input block 55 of the servo hydraulic controller 49. The signal is processed and is compared to the desired frequency and displacement values in a servo valve output block 57. The servo-valve output block provides an error signal to servo valve 19. Servo valve 19 controls the hydraulic actuator 17 movement to minimize the error signal. As shown in FIG. 2, when vibration begins a dry friction period between the parts is first encountered. As frictional heating between the parts increases an unsteady state melting and flow period begins which transition into a linear steady state flow period. During the unsteady state melting and flow, and the linear steady state flow period material is extruded out at the weld interface. When the desired weld penetration of 0.1 inches is reached, as determined by LVDT 45 signal which is continuously monitored and processed by a penetration LVDT input block 59 of servo hydraulic controller 49 and compared to the desired weld penetration, the vibration of the parts ceases. Vibration of the parts stops at 5.2 seconds in the graph shown in FIG. 2. A slight additional penetration occurs since pressure is still being maintained on the lower platform 27 by the hydraulic cylinders 33. When the pressure is released the parts elongate slightly and the welded parts are removed from the vibration welding machine. The weld penetration required to achieve good weld strength in Xenoy thermoplastic resin is a weld penetration of greater than 0.01 inches, as will be discussed hereinbelow. A greater weld penetration was performed on the part the results of which are shown in FIG. 2, to clearly show the three phases that can occur at the interface between the two parts during vibration welding.

Weld time is a very unreliable index of weld quality since the dry friction period varies depending on part uniformities and variations in pressure. Instead, weld quality correlates well with the amount of material extruded out at the weld interface during a weld. This can be measured by the weld penetration. Tests have shown that there is a critical distance (penetration) by which the parts must approach each other for a high quality weld. A significant degradation of strength occurs for penetrations below this critical value. Preliminary test results on several thermoplastics are shown in FIGS. 3–6.

Figure 3:
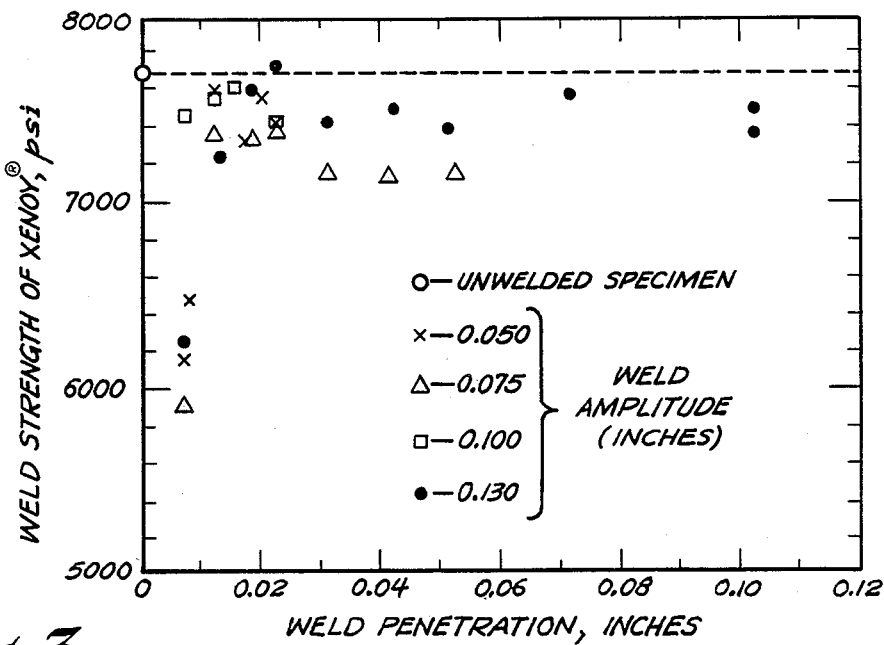
FIG. 3 is a graph showing the weld strength of Xenoy ® thermoplastic resin versus weld penetration at a variety of weld amplitudes.

Referring now to FIG. 3 the weld strength of Xenoy thermoplastic resin measured at room temperature and at a strain rate of $0.25 \times 10^{-2} s^{-1}$ versus weld penetration is shown. The weld frequency for all the data shown in the graph was 120 Hz and the weld pressure was 107 psi. Different weld amplitudes are shown but for all weld amplitudes a weld penetration of less than 0.010 inches does not result in a reliable weld. At penetrations greater than 0.01 inches high strength reliable welds are obtained. Although a drastic reduction in strength for weld penetrations less than 0.010 inches appears to occur, the strengths do not appear to be affected by weld amplitude or weld time when weld penetrations are greater than 0.010 inches.

Figure 4:
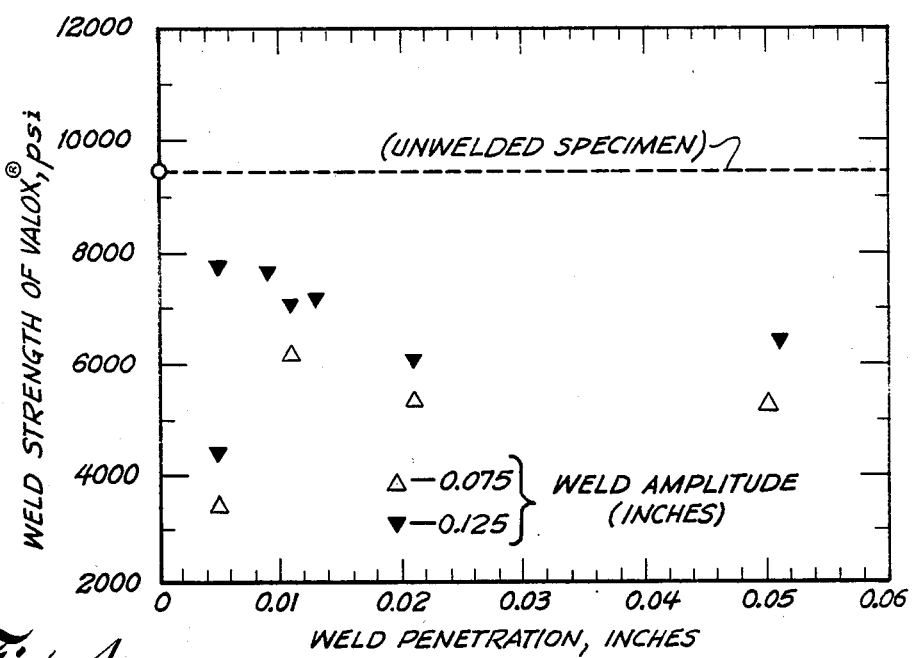
FIG. 4 is a graph showing the weld strength of Valox ® thermoplastic resin versus weld penetration at two weld amplitudes.

Referring now to FIG. 4, weld strength of Valox thermoplastic resin is shown versus weld penetration. The weld strength of Valox is measured at room temperature at a strain rate of $10^{-2} s^{-1}$. The welds were performed with a weld frequency of 120 Hz and a weld pressure of 100 psi. Welds with a weld penetration greater than 0.006 inches appear to have high weld strength. There appears to be a preferable weld penetration range above which weld strength decreases.

Figure 5:
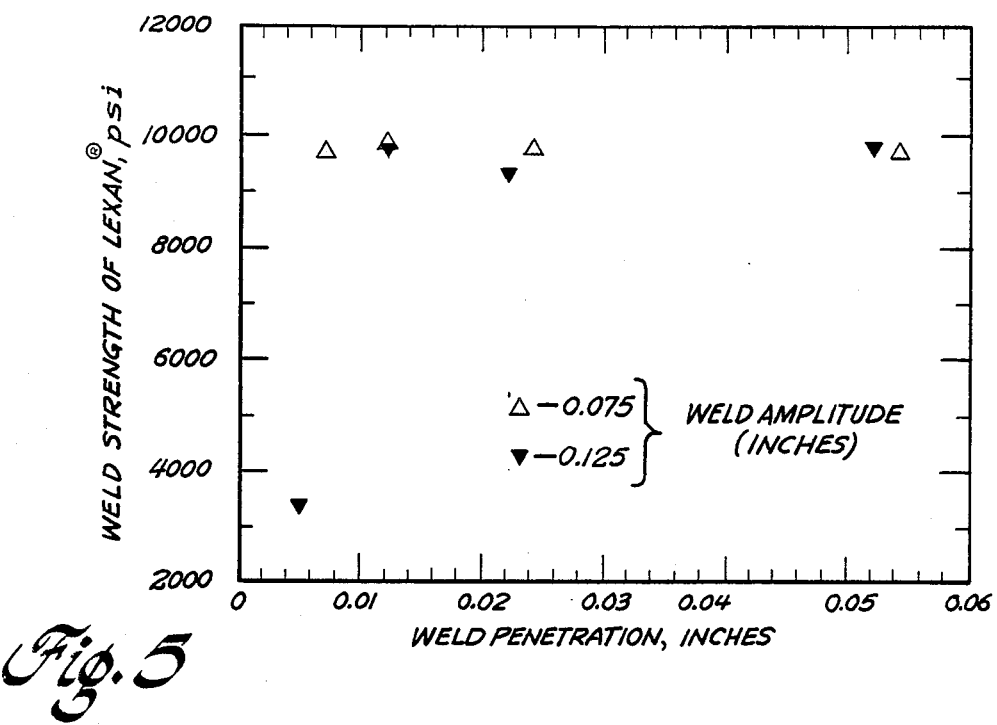
FIG. 5 is a graph showing weld strength of Lexan thermoplastic resin versus weld penetration for two weld amplitudes.

Referring to FIG. 5, weld strength versus weld penetration for Lexan is shown with the weld strength measured at room temperature at a strain rate of $10^{-2} s^{-1}$. The welds were performed with a weld frequency of 120 Hz and weld pressure of 130 psi. Welds having a penetration greather than 0.01 inches appear to have consistent high strength.

Figure 6:
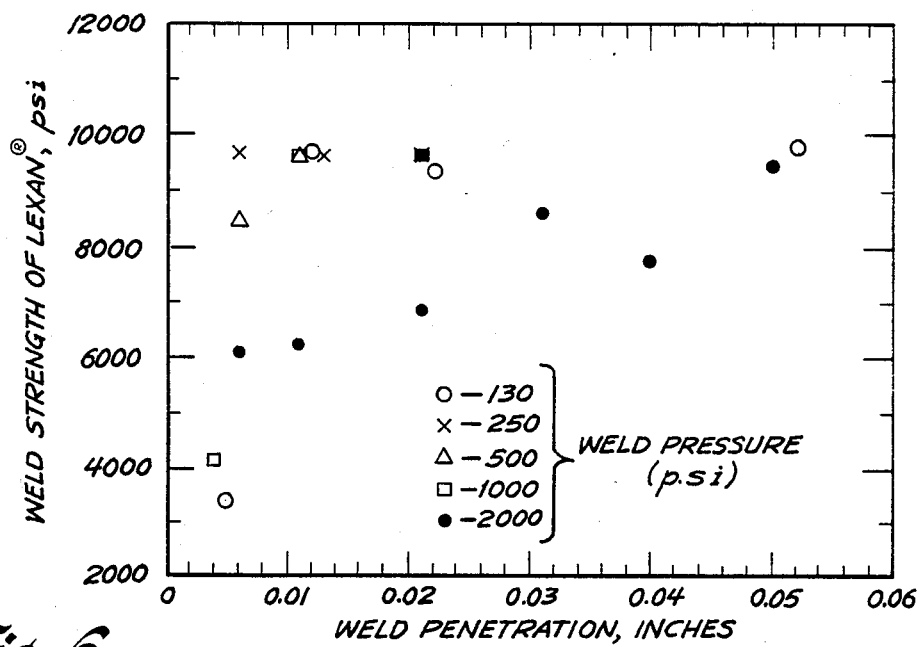
FIG. 6 is a graph showing weld strength of Lexan thermoplastic resin versus weld penetration for a variety of weld pressures.

Referring now to FIG. 6 weld strength of Lexan measured at room temperature at a strain rate of $10^{-2} s^{-1}$ versus weld penetration for welds made at a frequency of 120 Hz and a weld amplitude of 0.125 inches is shown. Weld pressures were varied and a minimum weld penetration above which weld strength improves is again seen.

From the preliminary data in FIGS. 3–6 for the thermoplastic tested weld penetration controls weld strength.

The foregoing decribes a method and a control system for a weld machine that provides uniform quality welds that are repeatable.

While the invention has been particularly shown and described with reference to a preferred embodiment thereof, it will be understood by those skilled in the art that various changes in form and details may be made without departing from the spirit and scope of the invention.

What is claimed is:

1. A method for non-ultrasonic vibration welding thermoplastic parts to obtain uniform quality welds, comprising the steps of:

holding the parts to be welded together under pressure with the surfaces to be welded in contact with one another;

vibrating one part relative to the other in the plane of the surfaces to be welded causing the surfaces in contact with one another to melt;

continuously monitoring the weld penetration; and stopping the vibration of one part relative to the other when a predetermined weld penetration has been reached.

2. A non-ultrasonic vibration welding machine for welding two parts together with uniform quality welds comprising:

means for applying pressure along the interface of the parts to be welded;

means for reciprocally moving the parts to be welded along their common interface in an intermittent linear motion relative to one another;

means for continuously monitoring weld penetration during the vibration welding process; and means for stopping the movement of the parts being welded along their common interface when a predetermined weld penetration has been achieved.

* * * * *